United States Patent
Alperovich et al.

(10) Patent No.: US 6,751,477 B1
(45) Date of Patent: Jun. 15, 2004

(54) SYSTEMS AND METHODS FOR DYNAMICALLY OPTIMIZING THE FIDELITY OF A SPEECH SIGNAL RECEIVED FROM A WIRELESS TELEPHONY DEVICE AND TRANSMITTED THROUGH A PACKET-SWITCHED NETWORK

(75) Inventors: Vladimir Alperovich, Dallas, TX (US); Andreea Timberlake, Grapevine, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/574,122

(22) Filed: May 17, 2000

(51) Int. Cl.[7] ............................. H04B 1/38; H04M 1/00; H04Q 7/20; H04L 12/28; H04L 12/56
(52) U.S. Cl. .................... 455/560; 455/422.1; 370/468; 370/352; 370/401
(58) Field of Search ................................. 370/352, 465, 370/468, 401; 455/560, 561, 550, 422.1, 445, 452.2, 414, 423, 424, 67.11

(56) References Cited

U.S. PATENT DOCUMENTS

| | | | |
|---|---|---|---|
| 6,192,395 B1 * | 2/2001 | Lerner et al. | 709/204 |
| 6,256,487 B1 * | 7/2001 | Bruhn | 455/352 |
| 6,445,697 B1 * | 9/2002 | Fenton | 370/357 |
| 6,600,738 B1 * | 7/2003 | Alperovich et al. | 370/352 |
| 6,603,774 B1 * | 8/2003 | Knappe et al. | 370/466 |
| 6,611,694 B1 * | 8/2003 | Oltedal et al. | 455/560 |
| 6,633,582 B1 * | 10/2003 | Panburana et al. | 370/465 |
| 2001/0043577 A1 * | 11/2001 | Barany et al. | 370/328 |

FOREIGN PATENT DOCUMENTS

| | | |
|---|---|---|
| EP | 0 966 145 A | 12/1999 |
| WO | WO 99 05830 A | 2/1999 |
| WO | WO 99 53700 A | 10/1999 |

OTHER PUBLICATIONS

Bruhn S et al: "Concepts and solutions for link adaptation and inband signaling for the GSM AMR speech coding standard" Vehicular Technology Conference, 1999 IEEE 49th Houston, TX, USA May 16–20, 1999, Piscataway, NJ, USA, IEEE, US May 16, 1999, pp. 2451–2455, XP010342317 ISBN: 0–7803–5565–2 p. 2451, column 2, line 5–line 10 and page 2451, column 2, line 15–line 18.

* cited by examiner

*Primary Examiner*—Vivian Chin
*Assistant Examiner*—Raymond B. Persino

(57) ABSTRACT

Systems and methods for dynamically optimizing the fidelity of a speech signal received from a wireless telephony device and transmitted through a packet-switched network. In an exemplary embodiment, at least one Quality of Speech (QoS) transmission characteristic is determined for a packet-switched network intermediate to the a first Media Gateway (MGW) and a second MGW; the fidelity of speech transmitted through the packet-switched network being a function of the QoS transmission characteristic. A speech codec is dynamically-selected as a function of the QoS transmission characteristic of the packet-switched network. The speech signal is encoded into speech data using the dynamically-selected speech codec, and transmitted through the packet-switched network from the first MGW to the second MGW. The second MGW decodes the speech data using the dynamically-selected speech codec.

30 Claims, 2 Drawing Sheets

SYSTEMS AND METHODS FOR DYNAMICALLY OPTIMIZING THE FIDELITY OF A SPEECH SIGNAL RECEIVED FROM A WIRELESS TELEPHONY DEVICE AND TRANSMITTED THROUGH A PACKET-SWITCHED NETWORK

TECHNICAL FIELD OF THE INVENTION

The present invention is directed, in general, to wireless communications systems and, more specifically, to systems and methods for dynamically optimizing the fidelity of a speech signal received from a wireless telephony device and transmitted through a packet-switched network.

BACKGROUND OF THE INVENTION

The world is currently experiencing revolutionary changes in communication systems, brought about in part by the general availability of access to the Internet. In particular, interest in Internet Protocol (IP) telephony, or Voice over IP (VoIP), has expanded rapidly as the associated technologies have matured. The interoperability of IP networks with other voice communications networks, such as the Public Switched Telephone Network (PSTN) and wireless communications networks, however, is a prominent factor in the eventual success of Internet telephony.

The telecommunications industry has also recently undergone a revolution in the area of wireless telephony; e.g., "cellular" or "mobile" devices. Wireless telecommunications networks are an adjunct to the PSTN, and depend upon the circuit-switched network of the PSTN for communications with conventional wired telephony devices as well as with mobile devices. Thus, the routing of information to a mobile device communicating with a wireless telecommunications network has heretofore also required such information to be routed through the PSTN.

Because of the proliferation of both IP networks and wireless telephony systems, it is desirable to develop systems and methods to route voice calls from wireless telephony devices over IP networks. One of the deficiencies of IP networks, however, is that such networks are not inherently suited to the transport of voice information. This is due to the fact that such networks can suffer from delays in delivering packets and limitations in bandwidth, which are factors related to the QoS of the IP network, thus affecting the "fidelity" of the received voice information. Furthermore, the QoS of the IP network may vary over the duration of a voice call. Thus, there is a need in the art for systems and methods for optimizing the fidelity of a speech signal received from a wireless telephony device and transmitted through a packet-switched network, such as an IP network. In particular, there is a need in the art for systems and methods for continuously, or "dynamically," optimizing the fidelity of such speech signals over the duration of a voice call.

SUMMARY OF THE INVENTION

To address the above-discussed deficiencies of the prior art, the present invention relates to systems and methods for dynamically optimizing the fidelity of a speech signal received from a wireless telephony device and transmitted through a packet-switched network. In an exemplary embodiment described hereinafter, at least one Quality of Speech (QoS) transmission characteristic is determined for the packet-switched network intermediate to the a first Media Gateway (MGW) and a second MGW coupled to the packet-switched network; the fidelity of speech transmitted through the packet-switched network being a function of the QoS transmission characteristic. A speech codec is dynamically-selected as a function of the QoS transmission characteristic of the packet-switched network. The speech signal is encoded into speech data using the dynamically-selected speech codec, and transmitted through the packet-switched network from the first MGW to the second MGW. The second MGW decodes the speech data using the dynamically-selected speech codec.

The identification of the dynamically-selected speech codec can also be communicated to the wireless telephony device to allow it to adapt its encoding format to a preferred format for a given QoS of the packet-switched network. The QoS transmission characteristic of the packet-switched network can be, for example, an average packet-delay or packet throughput. In addition, the dynamically-selected speech codec can be further selected as a function of an air-interface Quality Indicator (QI) provided by the wireless telephony device. In such embodiments, the fidelity of the received speech signal can be optimized as function of the quality of both the wireless transmission path and the packet-switched network (which can comprise or include wireless transmission paths). In implementations in which the wireless communications network conforms to the Global Standard for Mobile Communications (GSM), the dynamically-selected speech codec can be Enhanced Full Rate (EFR), Full Rate (FR), and Half Rate (HR).

In an implementation particularly described hereinafter, the speech data is transmitted through a packet-switched network using an Internet Protocol (IP) based network layer; the scope of the invention, however, includes the use of other packet-switched protocols, such as Asynchronous Transfer Mode (ATM). In addition to the use of IP, the speech data can be transmitted using a transport layer protocol such as User Datagram Protocol (UDP) or Transport Control Protocol (TCP).

Upon receipt of speech data at the destination MGW, it may be necessary to encode the data into a different format for transmission through another network. For example, if the destination of the speech data is a telephony device coupled to the Public Switched Telephone Network (PSTN), the destination MGW, in addition to decoding the speech data received over the packet-switched network using the dynamically-selected speech codec, must further convert the speech data to Pulse Code Modulated (PCM) data for transmission over the PSTN.

The foregoing has outlined, rather broadly, the principles of the present invention so that those skilled in the art may better understand the detailed description of the exemplary embodiments that follow. Those skilled in the art should appreciate that they can readily use the disclosed conception and exemplary embodiments as a basis for designing or modifying other structures and methods for carrying out the same purposes of the present invention. Those skilled in the art should also realize that such equivalent constructions do not depart from the spirit and scope of the invention in its broadest form, as defined by the claims provided hereinafter.

BRIEF DESCRIPTION OF THE DRAWINGS

For a more complete understanding of the present invention, reference is now made to the following detailed description taken in: conjunction with the accompanying drawings, in which.

DETAILED DESCRIPTION

Figure 1:
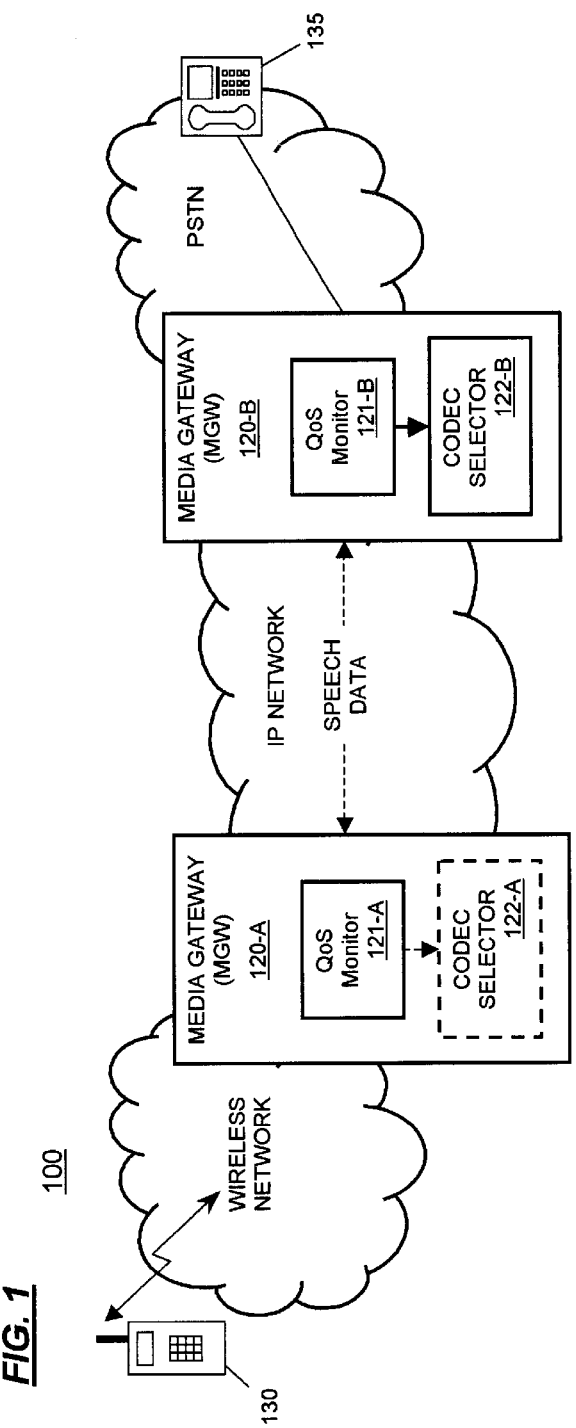
FIG. 1 illustrates an exemplary system for dynamically optimizing the fidelity of a speech signal received from a wireless telephony device and transmitted through a packet-switched network according to the principles of the present invention.

Referring to FIG. 1, illustrated is an exemplary system 100 for dynamically optimizing the fidelity of a speech signal received from a wireless telephony device and transmitted through a packet-switched network according to the principles of the present invention. In the exemplary system 100, the packet-switched network is an Internet Protocol (IP) based network; in alternate embodiments, the packet-switched network can use other protocols such as Asynchronous Transfer Mode (ATM). The IP network is coupled to a wireless communications network by a Media Gateway (MGW) 120-A, and to a Public Switched Telephone Network (PSTN) by MGW 120-B. During a call between a wireless telephony device 130 (such as a mobile or "cellular" telephone) and a second telephony device 135, the MGWs 120-A and 120-B are used to send and receive speech data to/from the IP network. Because the packets carrying the speech data can be delayed or lost, and the IP network bandwidth can be reduced due to heavy traffic, the Quality of Service (QoS) provided by the IP network can cause the "fidelity" of the received speech signal to be degraded.

As used herein, "fidelity" is used to describe the relative quality of a received signal to an original signal; e.g., the sound heard by a user of telephony device 135 when a user of wireless telephony device 130 speaks. In the exemplary system 100, the fidelity of a voice signal received by telephony device 135 from wireless telephony device 130 is a function of the quality of the air interface of the wireless network, the QoS of the IP network, and the sampling rate of the input voice signal and resolution of the codec used for encoding and decoding the signal.

As illustrated in FIG. 1, a QoS Monitor 121-A and 121-B is associated with each MGW 120-A and 120-B, respectively. Although each QoS Monitor is illustrated as being integral to each MGW, the function provided by a QoS Monitor can be implemented externally. The principles of the present invention are not dependent on the specific implementation of QoS Monitors, the implementation and function of which are known to those skilled in the art. The QoS Monitors monitor certain statistics of the IP network, such as packet delay, packet loss, and available bandwidth.

In FIG. 1, voice communications are provided between wireless telephony device 130 and wired telephony device 135 using a wireless network, an IP network, and the PSTN; the networks are coupled by MGWs 120-A and 120-B. If the wireless network is based on the Global Standard for Mobile Communications (GSM), for example, the speech of a user of wireless telephony device 130 can be encoded for transmission through the wireless network using a Half Rate (HR), Full Rate (FR), or Enhanced Full Rate (EFR) codec, as defined by the GSM standards; other defined codecs can be used, however, based on other types of wireless networks, such as Code Division Multiple Access (CDMA) based wireless networks. In the conventional PSTN, the speech of a user of wired telephony device 135 is transmitted through the PSTN using 64 kbps Pulse Code Modulation (PCM). The object of the present invention is to dynamically select an optimal codec used to encode the speech data for communication through the IP network, as a function of QoS statistics of the IP network.

The codec dynamically selected for encoding the speech data for transmission through the IP network can be, but is not necessarily, the same as the codec used to encode the speech data for transmission through the wireless network (e.g., HR, FR or EFR). As depicted in FIG. 1, if the encoding for the IP network is always to be the same as that used for encoding the speech data transmitted through the wireless network, the codec selector 122-A in MGW 120-A is not required (or is optional). Those skilled in the art will recognize that if the speech data received by MGW 120-A from wireless telephony device 130 is already encoded using a desired codec (e.g., based on previous network conditions or a predefined initial codec), that speech data can be packetized and transmitted through the IP network; i.e., no decoding and re-encoding is necessary. Whenever a QoS Monitor indicates that the codec should be changed, a MODE command can be sent to the wireless telephony device to instruct it to change its codec. Alternatively, the QoS Monitor 121-A can cause the Codec Selector 122-A to dynamically-select a codec for decoding speech data received from wireless telephony device 130 and re-encoding that data for transmission through the IP network. In such embodiments, the speech transmitted through the wireless network can be encoded using a higher-quality codec, such as EFR, and then converted by MGW 120-A using a lower-quality codec for transmission through the IP network if the current QoS of the IP network is not optimally-suited to transmission of the speech data using the higher-quality codec.

The identification of the dynamically-selected speech codec can also be communicated to the wireless telephony device 130 to allow it to adapt its encoding format to a preferred format for a given QoS of the IP network. In GSM networks, this can be accomplished using a MODE command to instruct the wireless telephony device 130 to change its codec. In addition, the dynamically-selected speech codec can be further selected as a function of an air-interface Quality Indicator (QI) provided by the wireless telephony device 130. In such embodiments, the fidelity of the received speech signal can be optimized as function of the quality of both the wireless transmission path and the packet-switched network (which can comprise or include wireless transmission paths).

Upon receipt of speech data at the destination MGW 120-B, it may be necessary to encode the data into a different format for transmission through another network. For example, as illustrated in FIG. 1, if the destination of the speech data is a wired telephony device 135 coupled to the PSTN, the destination MGW 120-B, in addition to decoding the speech data received over the IP network using the dynamically-selected speech codec, must further convert the speech data to 64 kbps PCM data for transmission over the PSTN.

Figure 2:
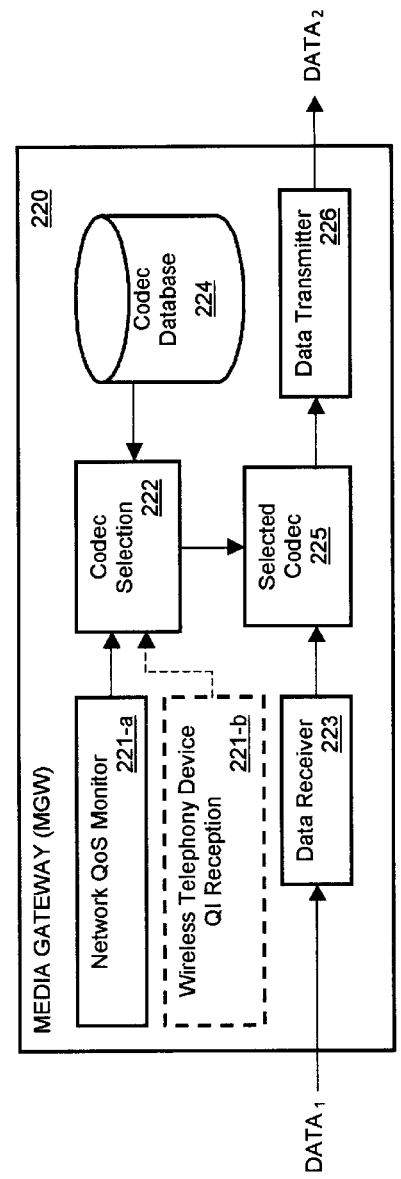
FIG. 2 illustrates an exemplary Media Gateway (MGW) adapted in accordance with the principles of the present invention.

Referring now to FIG. 2, with continuing reference to FIG. 1, illustrated is an exemplary MGW 220 adapted to implement the principles of the present invention. The MGW 220 includes a Network QoS Monitor 221-$a$ and, optionally, Wireless Telephony Device QI Reception 221-$b$.

The Wireless Telephony Device QI Reception 221-b can be implemented as a process to query the wireless network, or wireless telephony device 130, for the QI of the air interface associated with communications between wireless telephony device 130 and the wireless network. The QoS statistics determined by Network QoS Monitor 221-a and, optionally, the QI, are provided to a Codec Selection process 222.

The Codec Selection process 222 uses the QoS statistics and/or QI to query a Codec Database 224. A network operator can predefine the codec selection parameters, or rules; those skilled in the art are familiar with rules-based processes for automating the configuration of a network or system, and the principles of the present invention are not limited to any specific selection parameters or rules. The Codec Database 224 contains the identities of a plurality of codecs, one of which is selected as a function of the QoS statistics and/or QI. The selected codec 225 is then used by the MGW 220 for encoding/decoding speech data to be routed from one network to another, e.g., from the wireless network to the IP network, or vice versa. When speech data, such as $DATA_1$, is received from one network by a data receiver 223, it is decoded/encoded, as necessary, using the selected codec 225; the resulting speech data ($DATA_2$) is then transmitted by data transmitter 226 on the other network. Those skilled in the art will recognize that the functional elements of MGW 220 can be implemented in software, hardware, firmware, or a combination thereof; all such implementations intended to be within the scope of the claims recited hereinafter.

Figure 3:
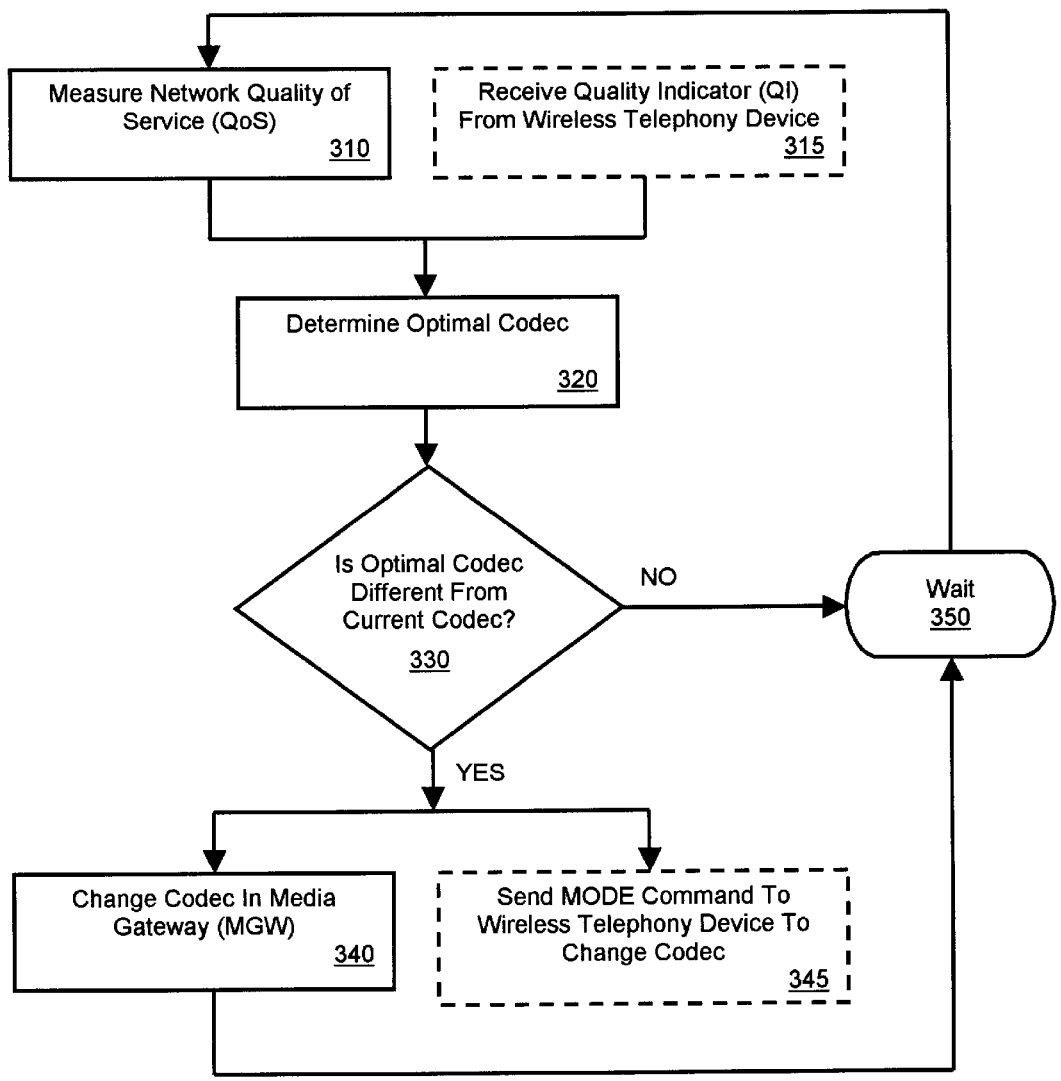
FIG. 3 illustrates an exemplary method for dynamically optimizing the fidelity of a speech signal received from a wireless telephony device and transmitted through a packet-switched network according to the principles of the present invention.

Referring now to FIG. 3, with continuing reference to FIG. 1 and FIG. 2, illustrated is an exemplary method 300 for dynamically optimizing the fidelity of a speech signal received from a wireless telephony device and transmitted through a packet-switched network according to the principles of the present invention. The method 300 includes a Step 310 in which the QoS statistics of the IP network are monitored. In addition to Step 310, a Step 315 can be used to receive a QI from wireless telephony device 130. Using the QoS statistics and/or QI, the optimal codec is determined in Step 320; as previously noted, a network operator can predefine the codec selection parameters, or rules. If the optimal codec is the same as the currently selected codec, determined in Step 330, the method preferably enters a wait state (Step 350) prior to again performing the process of selecting an optimal codec. If the optimal codec is not the same as the currently selected codec, the codec in the MGW is changed in Step 340 and, if desired, a MODE command is sent to wireless telephony device 130 to instruct it to change its codec. The method 300 then enters into the wait step. provided by Step 350.

The duration of the wait state provided by Step 350 can be predetermined or can be varied as a function of variations in network QoS. For example, if a recent measure of packet delay is within a given range of an average packet delay statistic, the network is likely in a stable quiescent state and it is typically unnecessary to frequently determine the optimal codec. If the QoS statistics of the network, or the QI of the wireless telephony device 130, are more dynamic, however, it may be desirable to determine the optimal codec more frequently, and the duration of the wait state is preferably shortened.

The present invention provides significant advantages to communications systems, in general, and the invention is particularly advantageous for use with wireless communications networks. The principles of optimizing the fidelity of a speech signal received from a wireless telephony device and transmitted through a packet-switched network disclosed herein can provide a user of a wireless telephony device with better speech quality, and a service provider will gain the benefit of better network coverage and capacity. Although the present invention has been described in detail, those skilled in the art will conceive of various changes, substitutions and alterations to the exemplary embodiments described herein without departing from the spirit and scope of the invention in its broadest form. The exemplary embodiments presented herein illustrate the principles of the invention and are not intended to be exhaustive or to limit the invention to the form disclosed; it is intended that the scope of the invention be defined by the claims appended hereto, and their equivalents.

What is claimed is:

1. A method for dynamically optimizing the transport of a speech signal received from a wireless telephony device through a packet-switched network, said method comprising the steps of:

determining at least one Quality of Speech (QoS) transmission characteristic of said packet-switched network intermediate to a first Media Gateway (MGW) and a second MGW coupled to said packet-switched network, the fidelity of speech transmitted through said packet-switched network being a function of said at least one QoS transmission characteristic;

dynamically selecting a speech codec as a function of said at least one QoS transmission characteristic of said packet-switched network;

encoding said speech signal into speech data using said dynamically-selected speech codec;

transmitting said speech data through said packet-switched network from said first MGW to said second MGW; and decoding said speech data at said second MGW using said dynamically-selected speech codec.

2. The method recited in claim 1, further comprising the step of communicating the identification of said dynamically-selected speech codec to said wireless telephony device.

3. The method recited in claim 2, wherein said dynamically-select speech codes is selected from the group consisting of:

Enhanced Full Rate;

Full Rate; and

Half Rate.

4. The method recited in claim 1, wherein said dynamically-selected speech codec is further selected as a function of an air-interface Quality indicator (QI) provided by said wireless telephony device.

5. The method recited in claim 1, wherein said at least one Quality of Speech (QoS) transmission characteristic of said packet-switched network is selected from the group consisting of:

average packet-delay; and packet throughput.

6. The method recited in claim 1, wherein said speech data is transmitted through said packet-switched network using an Internet Protocol (IP).

7. The method recited in claim 6, wherein said speech data is transmitted through said packet-switched network using a User Datagram Protocol (UDP).

8. The method recited in claim 6, wherein said speech data is transmitted through said packet-switched network using a Transport Control Protocol (TCP).

9. The method recited in claim 1, further comprising the step of routing said speech data decoded by said second MGW to a Public Switched Telephone Network (PSTN).

10. The method recited in claim 9, wherein said step of decoding said speech data at said second MGW using said dynamically-selected speech codec comprises converting said speech data to Pulse Code Modulated (PCM) data.

11. A system for dynamically optimizing the transport of a speech signal received from a wireless telephony device through a packet-switched network, said system comprising:

means for determining at least one Quality of Speech (QoS) transmission characteristic of said packet-switched network intermediate to a first Media Gateway (MGW) and a second MGW, the fidelity of speech transmitted through said packet-switched network being a function of said at least one QoS transmission characteristic;

means for dynamically selecting a speech codec as a function of said at least one QoS transmission characteristic of said packet-switched network;

means for encoding said speech signal into speech data using said dynamically-selected speech codec;

means for transmitting said speech data through said packet-switched network from said first MGW to said second MGW; and means for decoding said speech data at said second MGW using said dynamically-selected speech codec.

12. The system recited in claim 11, further comprising means for communicating the identification of said dynamically-selected speech codec to said wireless telephony device.

13. The system recited in claim 11, wherein said dynamically-selected speech codec is further selected as a function of an air-interface Quality Indicator (QI) provided by said wireless telephony device.

14. The system recited in claim 11, wherein said dynamically-selected speech codes is selected from the group consisting of:

Enhanced Full Rate;

Full Rate; and

Half Rate.

15. The system recited in claim 11, wherein said at least one Quality of Speech (QoS) transmission characteristic of said packet-switched network is selected from the group consisting of:

average packet-delay; and packet throughput.

16. The system recited in claim 11, wherein said speech data is transmitted through said packet-switched network using an Internet Protocol (IP).

17. The system recited in claim 16, wherein said speech data is transmitted through said packet-switched network using a User Datagram Protocol (UDP).

18. The system recited in claim 16, wherein said speech data is transmitted through said packet-switched network using a Transport Control Protocol (TCP).

19. The system recited in claim 11, further comprising means for routing said speech data decoded by said second MGW to a Public Switched Telephone Network (PSTN).

20. The system recited in claim 19, wherein said means for decoding said speech data at said second MGW using said dynamically-selected speech codec comprises means for converting said speech data to Pulse Code Modulated (PCM) data.

21. A Media Gateway (MGW) for dynamically optimizing the transport of a speech signal received from a wireless telephony device through a packet-switched network, said MGW comprising:

a Quality of Speech (QoS) monitor for determining at least one transmission characteristic of said packet-switched network intermediate to said MGW and a second MGW, the fidelity of speech transmitted through said packet-switched network being a function of said at least one QoS transmission characteristic;

a process for dynamically selecting a speech codec as a function of said at least one QoS transmission characteristic of said packet-switched network;

an encoder for encoding said speech signal into speech data using said dynamically-selected speech code; and a transmitter for transmitting said speech data through said packet-switched network from said MGW to said second MGW.

22. The MGW recited in claim 21, further comprising means for communicating the identification of said dynamically-selected speech codec to said wireless telephony device.

23. The MGW recited in claim 21, wherein said dynamically-selected speech codec is further selected as a function of an air-interface Quality Indicator (QI) provided by said wireless telephony device.

24. The MGW recited in claim 21, wherein said dynamically-selected speech codec is selected from the group consisting of:

Enhanced Full Rate;

Full Rate; and

Half Rate.

25. The MGW recited in claim 21, wherein said at least one Quality of Speech (QoS) transmission characteristic of said packet-switched network is selected from the group consisting of:

average packet-delay; and packet throughput.

26. The MGW recited in claim 21, wherein said speech data is transmitted through said packet-switched network using an Internet Protocol (IP).

27. The MGW recited in claim 26, wherein said speech data is transmitted through said packet-switched network using a User Datagram Protocol (UDP).

28. The MGW recited in claim 26, wherein said speech data is transmitted through said packet-switched network using a Transport Control Protocol (TCP).

29. The MGW recited in claim 21, further comprising a mechanism for routing speech data received from said second MGW to a Public Switched Telephone Network (PSTN).

30. The MGW recited in claim 29, further comprising an encoder for converting said speech data to Pulse Code Modulated (PCM) data for transmission through said PSTN.

* * * * *